UNITED STATES PATENT OFFICE.

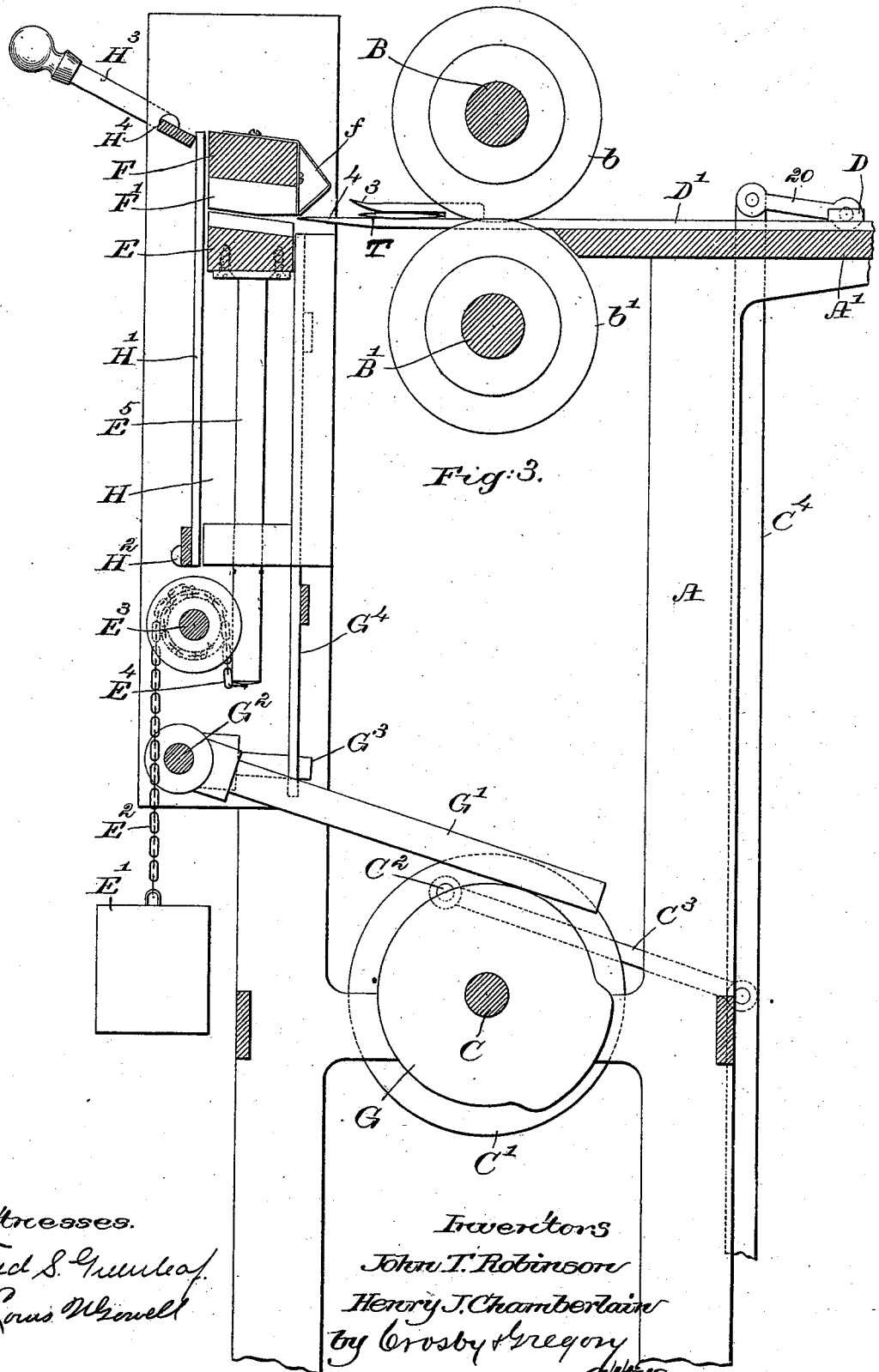

JOHN T. ROBINSON AND HENRY J. CHAMBERLAIN, OF HYDE PARK, MASSACHUSETTS, ASSIGNORS TO JOHN T. ROBINSON & CO., OF SAME PLACE.

MACHINE FOR CROSS-CUTTING AND COLLATING PAPER.

SPECIFICATION forming part of Letters Patent No. 501,027, dated July 4, 1893.

Application filed May 31, 1892. Serial No. 434,869. (No model.)

*To all whom it may concern:*

Be it known that we, JOHN T. ROBINSON and HENRY J. CHAMBERLAIN, of Hyde Park, county of Norfolk, State of Massachusetts, have invented an Improvement in Machines for Cross-Cutting and Collating Paper, of which the following description, in connection with the accompanying drawings, is a specification, like letters and figures on the drawings representing like parts.

In the manufacture of covers for cigarette and other boxes and what are called knockdown boxes, it is customary to first make the paper into a tube and then cut the tube transversely into cover or box lengths and these lengths are then collated by hand in bundles. This our present machine has for its object to cut these paper tubes in sections and thereafter collate them automatically ready to be done up in packages, but we desire it to be understood that our invention is to be herein described is not limited to the use of the machine to be described only for cutting tubular strips, for the same machine may be employed for cutting flat strips of paper transversely in the production of cards, labels, &c.

This invention has for its object to provide a machine for cross cutting paper, herein illustrated, as in the form of a tube.

Figure 1:
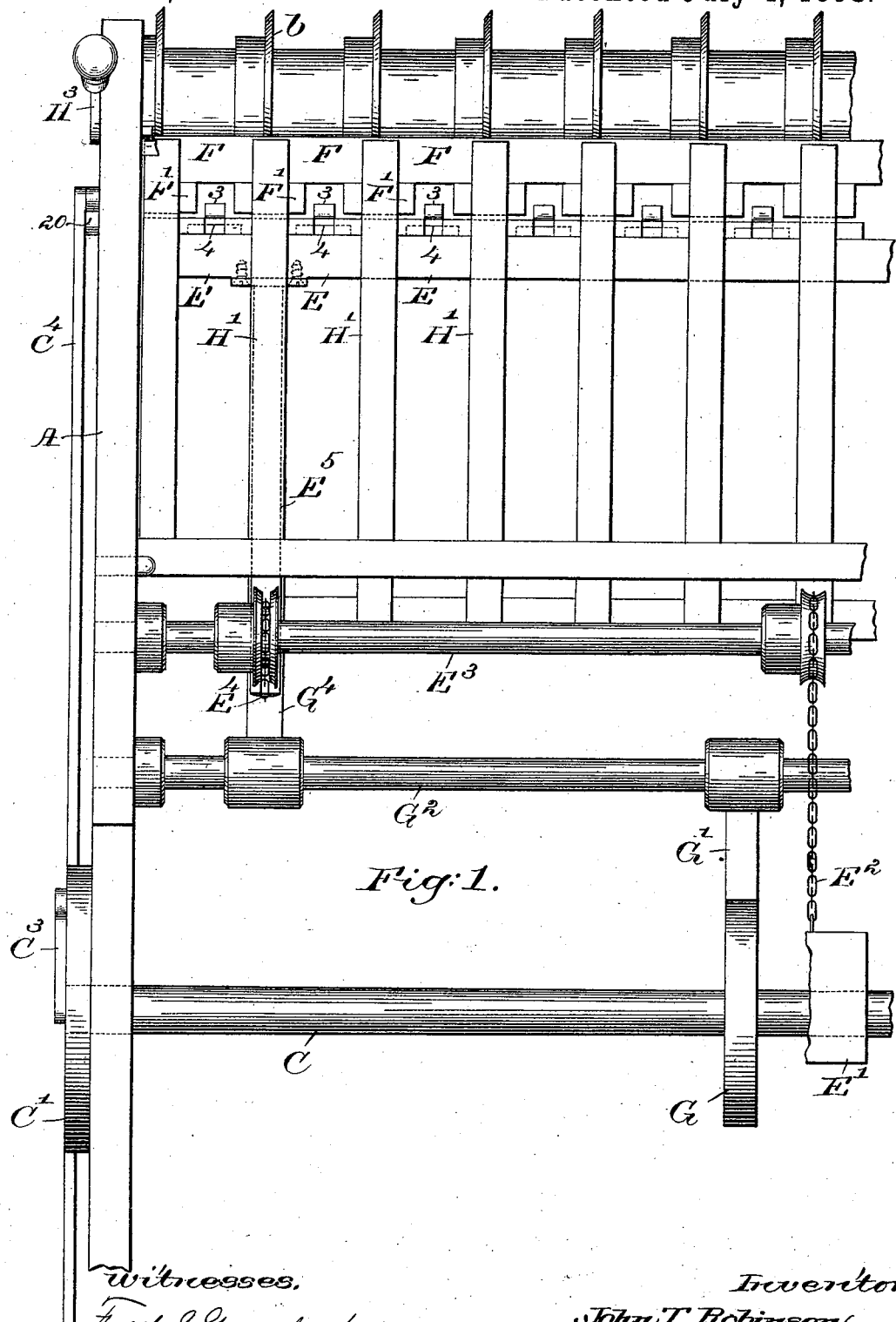
Figure 2:
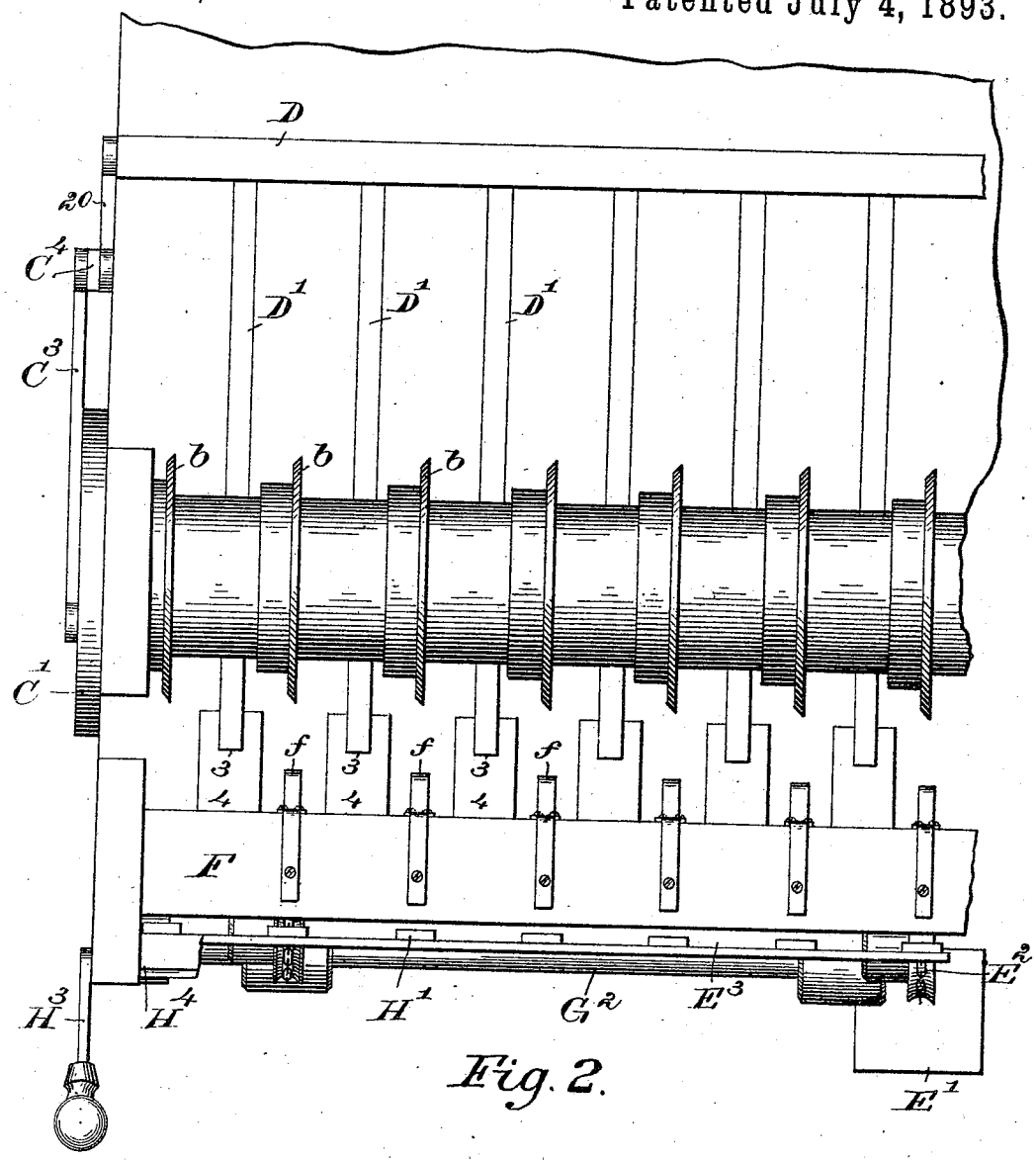

Figure 1, in front elevation represents a sufficient portion of a cross cutting machine with our improvements added to enable our invention to be understood. Fig. 2 is a partial top or plan view of the machine shown in Fig. 1; and Fig. 3 is an elevation looking at Fig. 1 from the right.

The frame-work A of any usual or suitable shape has at its upper side a bed plate or table A' and suitable bearings for the two rolls B, B', each having suitable annular cutters as $b, b'$, separated on the said shafts at the proper distances apart according to the length of the box or piece of paper to be formed by transversely cutting a tube or strip.

The parts so far described are and may be common to cross cutting machines, and instead of the particular blades we may use any other suitable cutters.

We have mounted in the frame-work a cam shaft C having at its opposite ends at the outside of the frame-work like disks or wheels C' having each a suitable crank pin as $C^2$ which is connected by a suitable link as $C^3$ with a lever $C^4$ suitably pivoted upon a proper pivot or stud located at the foot of the machine, the said stud not being herein shown.

The levers $C^4$ one at each side of the machine, are represented as connected by links 20 to the ends of a cross-bar D to which we have jointed a series of feeding bars D', the said bars being represented as provided with heads forked to present fingers 3, 4, the fingers 4 being represented as somewhat longer than the fingers 3 and as beveled or cam shaped at their under sides.

The bars D' are let into suitable recesses in the top of the table A' and when the said bars are fully retracted so that the heads referred to rest at the right-hand side of the cross cutting rolls, the said head has fed into it between its fingers a tube or strip of paper T, see Fig. 3 to be cut transversely, and thereafter by the crank and levers described, the bars are moved to the left viewing Fig. 3, so that the heads carry the tube or strip between the cross cutters, which latter cut the tube or strip into short lengths.

At the delivery end of the table we have arranged a follower E normally elevated in a yielding manner by or through the action preferably of a weight E' connected to a chain $E^2$, the latter being attached as represented to a shaft $E^3$ suitably supported in the framework, the said shaft having connected to it a second chain as $E^4$ which is attached to the shank $E^5$ of the follower E. Immediately above the follower, we have provided the machine with a cross girt F, upon the under side of which is a block F', the shape of which in cross section is best shown in Fig. 3.

Viewing Fig. 3 it will be noticed that the heads have been moved to the left past the cross cutters and that the finger 4 is about entering the space between the follower and the block F'. Now during the farther movement of the slides to the left, the inclined lower side of the finger 4 by contacting with the sloping top of the table, or against a piece of tube or card or paper lying thereon, will act to depress the follower, and the movement of the slides and head to the left will be sufficient in extent to place the tube or strip T of paper designated by dotted lines in Fig. 3, between the top of the follower and the under side of the block, and as the slide starts on its backward movement, the cam G on the shaft C strikes the arm G' fast on a rock-shaft G² of the machine and causes an arm G³ of the said shaft,—it being extended through a suitable slot in a stripper G⁴,— to raise said stripper from its full line position in Fig. 3 so that its upper end will come a little above the upper surface of the finger 4, so that as the head is pulled out from between the follower and block referred to, the said stripper by engaging the rear side of the tube or strip of paper will prevent it from being drawn back, and as a result thereof the said short tubes or strips will be left in position between the follower and the block, and as one after another tube or strip is added, the follower will descend into the space H which may be of greater or less length according to the number of pieces it is desired to collect in a pile before commencing to tie them into bundles.

We have shown the cross girt F as provided at intervals with noses $f$ to aid in keeping down the short tubes or pieces of paper as the head is carrying the same into the space between the follower and the block above it.

The space H is represented as closed by a series of uprights H' attached to a suitable rock-shaft H², the said uprights being maintained in position to close one side of the space H by means of a suitable locking device H³ represented in Fig. 1 as a lever pivoted at H⁴. By elevating the outer end of the lever referred to, the uprights H' may be turned over to the left viewing Fig. 3 leaving the operator free access to the series of tubes or pieces of paper then resting upon the follower in its depressed position.

In practice, the length of stroke of the slide bars D' is about nineteen inches.

This invention is not limited to the exact shape shown for the heads or fingers connected with the slides to engage the tubes or strips of paper and feed them automatically through between the cross cutters; nor to the exact shape of the follower and the blocks above it; nor to the exact devices for supporting the follower in a yielding manner so that it may descend as one after another tube or strip of paper is laid upon it by the feeding and collating slides, by which name we shall designate the slides having the heads suitably shaped and embraced and carrying the tubes or strips of paper to be cut transversely; nor is this invention limited to the particular construction shown for the stripper.

Preparatory to tipping down the uprights as stated the operator will preferably put sufficient pressure on the weight E' to cause the follower to rise sufficiently to firmly and securely clamp the mass of covers or pieces of paper between the follower and the blocks F' preparatory to removing said covers or pieces of paper.

We are aware that in machines for cross cutting paper, a series of cross cutting blades have been used in combination with a series of rotating feed rolls to feed the paper to said cutting blades and to remove the paper, when cut, from said blades, but so far as we are aware, it is new to employ reciprocating feeding and collating slides to positively engage the paper and move the same bodily between the cutting blades and to dispose them thereafter into a receptacle.

Having described our invention, what we claim as new, and desire to secure by Letters Patent, is—

1. A cross cutting and collating machine containing the following instrumentalities, viz:—a series of cross cutting blades and a receptacle for short lengths of material, and reciprocating feeding and collating slides adapted to positively engage and carry tubes or strips of paper bodily through between the cross cutting rolls and deposit them into the said receptacle, substantially as described.

2. The combination with the cross cutters and the reciprocating feeding and collating devices, of a follower and a block or plate above it, the said feeding and collating devices entering between the follower and said block or plate and depositing sections of the said tube or strip upon the follower, and means for supporting the follower in a yielding manner, substantially as described.

3. The follower, means to support it in a yielding manner, and a stripper, combined with cross cutting blades and with feeding and collating slides adapted to receive at one side of the said cross cutting blades, a tube or strip, carry it between said cross cutting blades to thereby effect the transverse cutting of the said tube or strip, the feeding and collating slides depositing said short lengths of tube or paper upon or in the path of vertical movement of the follower, substantially as described.

In testimony whereof we have signed our names to this specification in the presence of two subscribing witnesses.

JOHN T. ROBINSON.
HENRY J. CHAMBERLAIN.

Witnesses:
GEO. W. GREGORY,
EMMA J. BENNETT.